US008666625B1

(12) United States Patent
Georgin (10) Patent No.: US 8,666,625 B1
(45) Date of Patent: Mar. 4, 2014

(54) AUTOMATIC ADJUSTMENT OF ELECTRIC BRAKE ACTUATORS FOR A DRAGGING BRAKE CONDITION

(71) Applicant: Marc Georgin, Dayton, OH (US)

(72) Inventor: Marc Georgin, Dayton, OH (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/675,176

(22) Filed: Nov. 13, 2012

(51) Int. Cl.
*G06F 7/70* (2006.01)

(52) U.S. Cl.
USPC ............................................................ 701/70

(58) Field of Classification Search
USPC ................................ 701/3, 70, 71, 74, 90, 91
See application file for complete search history.

(56) References Cited

U.S. PATENT DOCUMENTS

| 8,102,280 B2 | 1/2012 | Cahill |
| 2002/0104718 A1* | 8/2002 | Suzuki ..................... 188/72.1 |
| 2005/0012501 A1* | 1/2005 | Isono et al. ................... 324/300 |
| 2006/0102436 A1 | 5/2006 | Haydon et al. |
| 2008/0135349 A1 | 6/2008 | Himes et al. |
| 2011/0198163 A1 | 8/2011 | Hanlon et al. |

FOREIGN PATENT DOCUMENTS

EP 1084949 A2 3/2001

* cited by examiner

*Primary Examiner* — Kim T Nguyen
(74) *Attorney, Agent, or Firm* — Cantor Colburn LLP (57) ABSTRACT

A method of automatically adjusting at least one electric actuator of a brake to prevent dragging is provided including measuring a force applied by the at least one electrical actuator to a load measuring device The measured force is determined to be below a predetermined threshold. A predefined offset is subtracted from a current zero torque position of the at least one electrical actuator. Similarly, a drag offset is subtracted from the current zero torque position of the at least one electrical actuator to compensate for a dragging brake condition. The new zero torque position is then stored within a brake actuator controller coupled configured to control the brake.

17 Claims, 8 Drawing Sheets

AUTOMATIC ADJUSTMENT OF ELECTRIC BRAKE ACTUATORS FOR A DRAGGING BRAKE CONDITION

BACKGROUND OF THE INVENTION

The present invention generally relates to braking systems, and more particularly, to systems and method to determine the presence of a dragging brake.

During takeoff, an aircraft reaches high speeds, and as such, the wheels of the aircraft also rotate at a high rate of speed. Once the aircraft takes off, the wheels begin to "spindown." Spindown is known in the art as the natural deceleration of wheels after takeoff. Spindown continues until the pilot actuates the landing gear system to retract and store the landing gear in the landing gear bay of the aircraft fuselage.

If a brake on a wheel is dragging (i.e., is at least partially engaged), then the brake may heat itself and/or other landing gear and/or wheel components to a very high temperature. The brake may drag for a number of reasons, including over pressurization of the brake, a parked brake that is too hot because it has not cooled sufficiently after a previous landing and corresponding brake engagement, a broken brake rotor/stator, an improper brake adjustment, ice wedged between the pressure plate of the brake and the actuator, and the like. Brake dragging and the resulting heat are undesirable, because if the wheel and brake are retracted into the bay while hot, there may be an increased risk of failure (for example, the tire may rupture and expel a portion of the tire or wheel through the fuselage, damaging the aircraft).

BRIEF DESCRIPTION OF THE INVENTION

According to one embodiment of the invention, a method of automatically adjusting an electric actuator of a brake to prevent dragging is provided including measuring a force applied by the at least one electrical actuator to a load cell. The measured force is determined to be below a predetermined threshold. A predefined offset is subtracted from a current zero torque position of the at least one actuator. Similarly, a drag offset is subtracted from the current zero torque position of the actuator to compensate for a dragging brake condition. The new zero torque position is then stored within a brake actuator controller configured to control the brake.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 7 according to an embodiment of the invention;

FIG. 8 according to an embodiment of the invention;

The detailed description explains embodiments of the invention, together with advantages and features, by way of example with reference to the drawings.

DETAILED DESCRIPTION OF THE INVENTION

Figure 1:
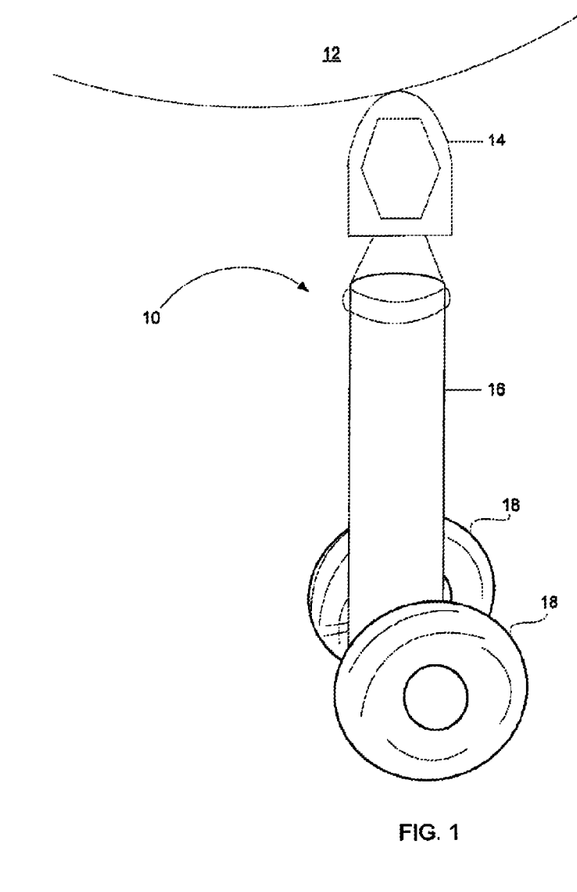
FIG. 1 is a side view of an exemplary aircraft landing gear, having two wheels, in an extended position.
Figure 2:
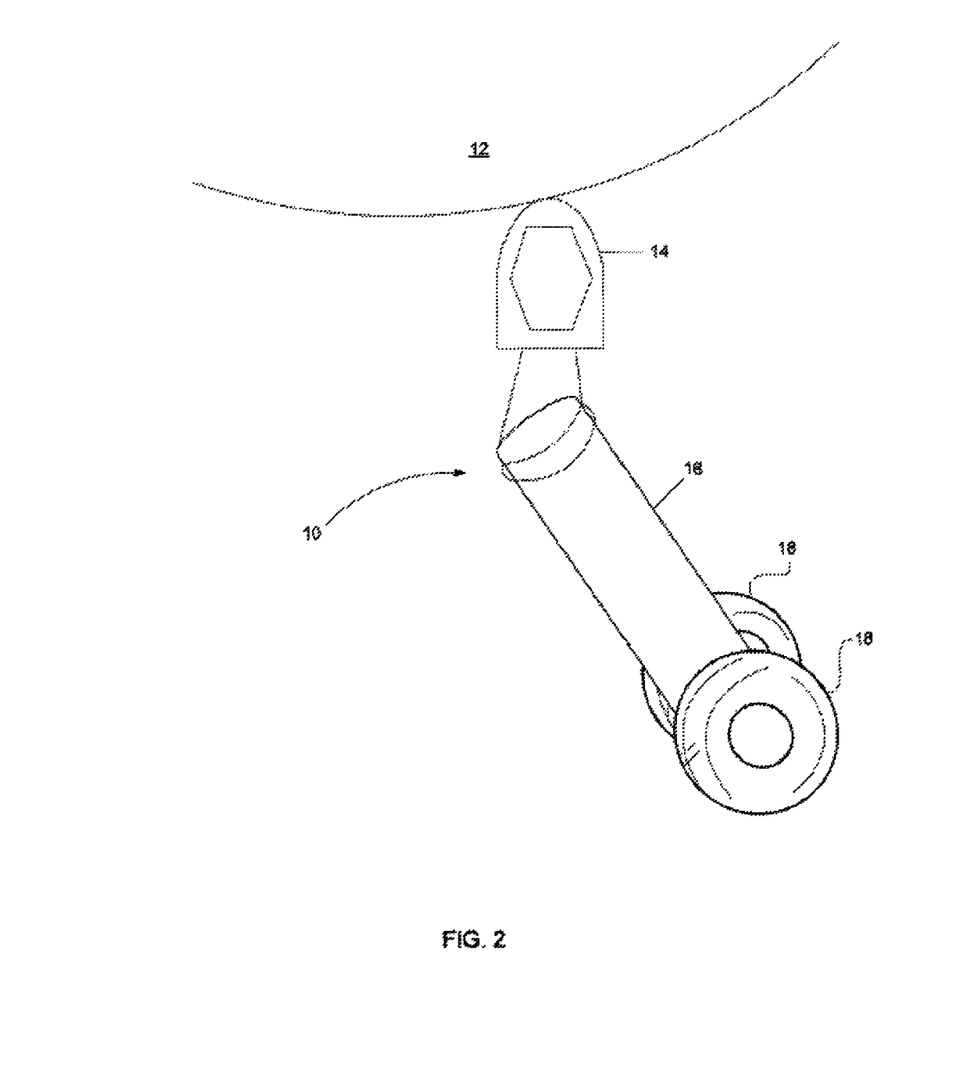
FIG. 2 is a side view of an exemplary aircraft landing gear, having two wheels, in a retracted position.

Referring now to FIGS. 1 and 2, an exemplary landing gear mechanism 10 is illustrated. FIG. 1 shows the landing gear mechanism 10 in a fully extended position, while FIG. 2 shows the landing gear mechanism 10 in a partially retracted position. It should be understood by a person having ordinary skill in the art that as an aircraft takes off, the landing gear mechanism 10 moves from a fully extended position to a partially retracted position, to a retracted position where the landing gear mechanism 10 is stowed within the aircraft fuselage. The landing gear mechanism 10 illustrated in FIGS. 1 and 2 is rotatably connected to an aircraft 12 by a coupling mechanism 14. In various embodiments, any suitable coupling mechanism can be used. The landing gear mechanism 10 includes a main column 16 and at least two wheels 18 rotatably coupled therewith. In various embodiments, any suitable coupling of the main column 16 and the wheels 18 may be used. While not illustrated in FIG. 1 or 2, at least one brake is attached to each of the wheels 18 in a manner understood by one of ordinary skill in the art. In various embodiments, the brakes are located within the wheel hubs.

Figure 3:
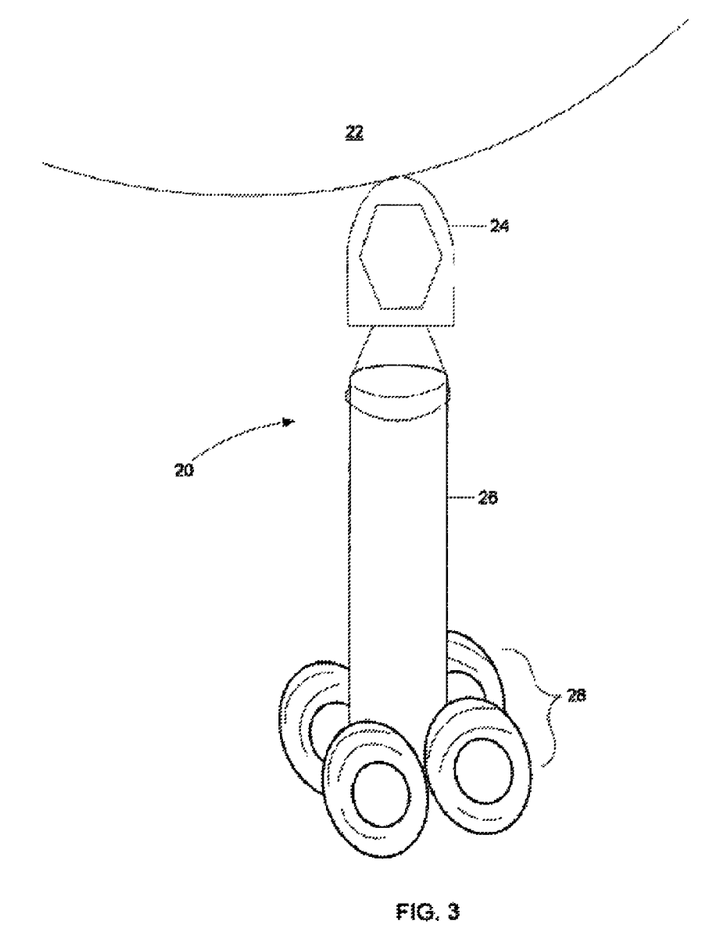
FIG. 3 is a side view of an exemplary aircraft landing gear, having four wheels, in an extended position.
Figure 4:
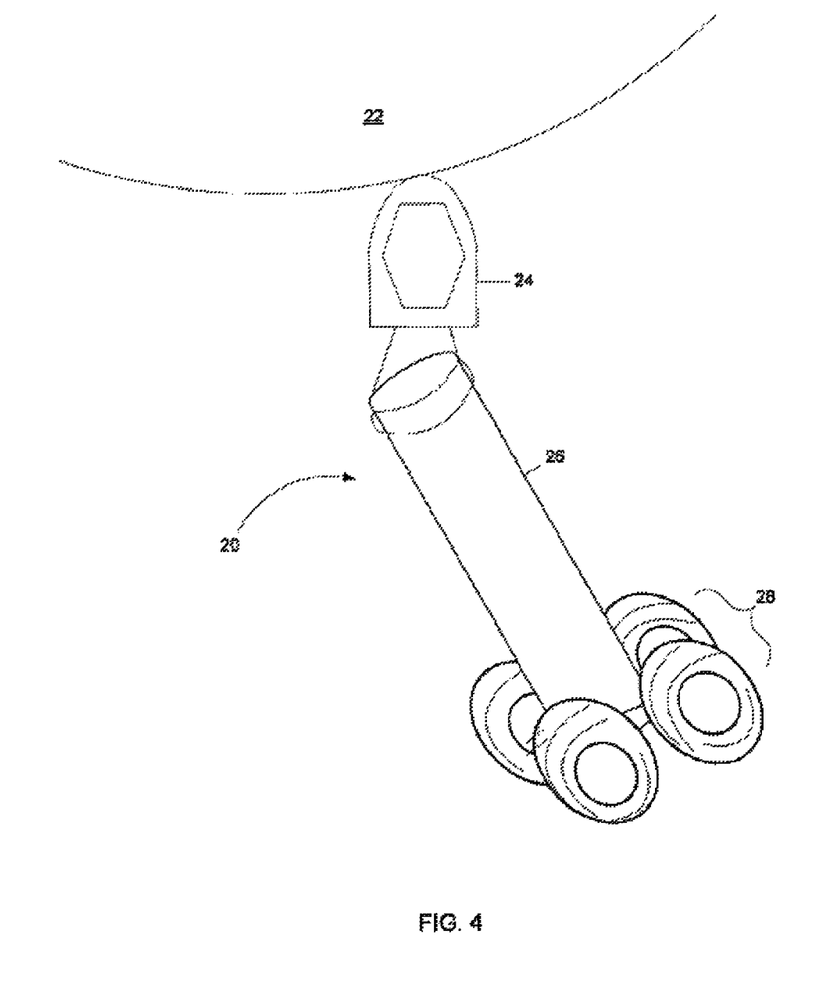
FIG. 4 is a side view of an exemplary aircraft landing gear, having four wheels, in a retracted position.

Referring now to FIGS. 3 and 4, another exemplary landing gear mechanism 20 is illustrated. FIG. 3 shows the landing gear mechanism 20 in a fully extended position, while FIG. 4 shows the landing gear mechanism 20 in a partially retracted position. It should be understood by a person having ordinary skill in the art that as an aircraft takes off, the landing gear mechanism 20 moves from a fully extended position to a partially retracted position, to a retracted position where the landing gear mechanism 20 is stowed within the aircraft fuselage. The landing gear mechanism 20 illustrated in FIGS. 1 and 2 is rotatably connected to an aircraft 22 by a coupling mechanism 24. In various embodiments, any suitable coupling mechanism can be used. The landing gear mechanism 20 includes a main column 26 and a plurality of wheels 28 rotatably coupled therewith. Likewise, in various embodiments, any suitable coupling of the main column 26 and the wheels 28 may be used. While not illustrated in FIG. 3 or 4, at least one brake is attached to each of the wheels 28 in a manner understood by one of ordinary skill in the art. Additionally, while only two-wheel and four-wheel configurations are illustrated in the FIGS., any number of wheels and associated brakes suitable for use in a landing gear mechanism may be used.

Figure 5:
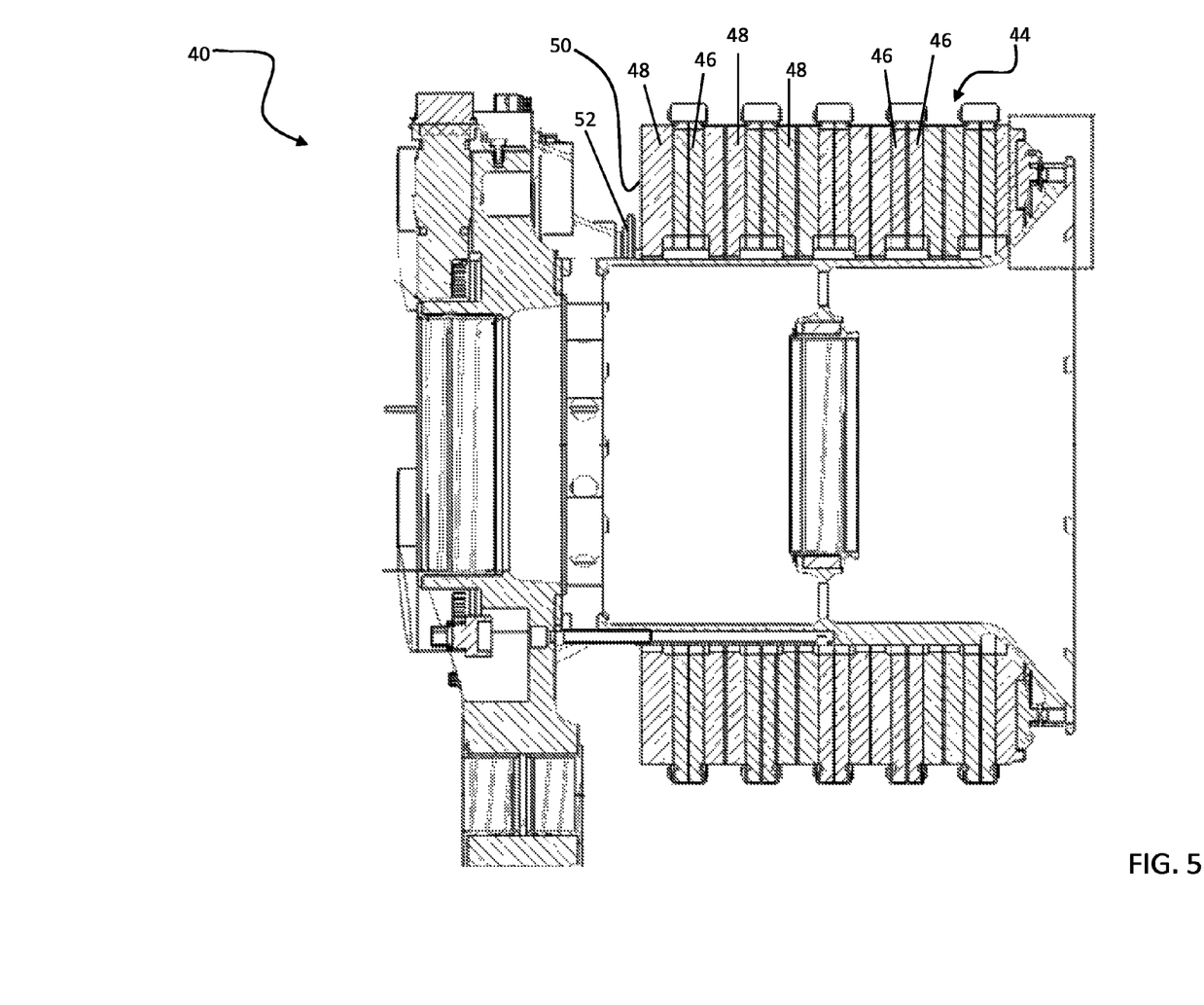
FIG. 5 is a block diagram of a system configured to detect a dragging brake in accordance with an embodiment of the invention.

The cross-section of a brake 40 configured for use with a wheel 18, 28 of a landing gear mechanism 10, 20 is illustrated in FIG. 5. In one embodiment, the brake 40 is a disc brake having a plurality of rotating discs 46 and a plurality of stationary discs 48 arranged in an alternating configuration. The rotating discs 46 are coupled to the wheel 18, 28 such that the plurality of rotating discs 46 and the wheel 18, 28 rotate in unison. The brake 40 also includes a plurality of actuators 52 positioned adjacent at least one end 50 of the stack 44 of discs 46, 48. In one embodiment, the brake 40 includes at least four actuators 52. The actuators 52 are configured to selectively apply a force to the stack 44 in response to a signal from a brake actuator controller 64 (see FIG. 6). The friction that occurs between the adjacent rotating discs 46 and the stationary discs 48, as a result of the force from the actuators 52, slows and/or stops the rotation of the wheel 18, 28. The actuators 52 are configured to move between a plurality of positions relative to the stack 44. For example, during take-off and generally while the aircraft is in flight, the actuators 52 are arranged in a "running clearance position" such that a gap exists between the stack 44 and the actuators 52 to prevent accidental engagement of the actuators 52 with the stack 44. When the aircraft is on the ground, such as during taxiing or anti-skid events, the actuators 52 may be arranged at a "zero torque position." In a zero torque position, the actuators 52 directly contact the end 50 of the stack 44, but do not, however, apply a force thereto.

Figure 6:
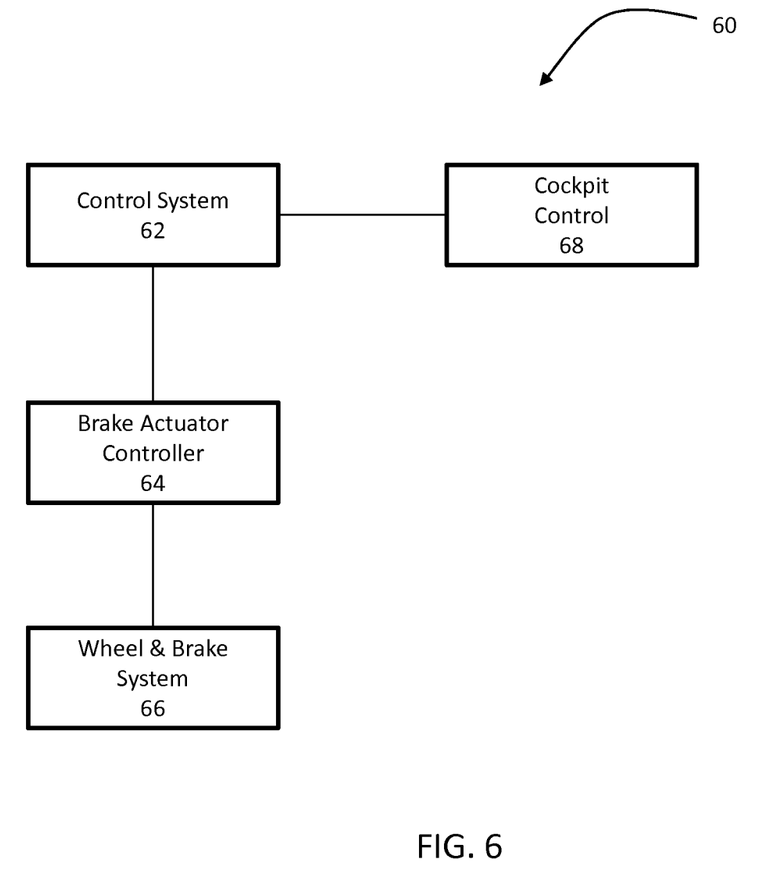
FIG. 6 is a flow diagram for a portion of the system shown in FIG. 5 in accordance with an embodiment of the invention.

A system 60, schematically illustrated in FIG. 6, is configured to monitor the position of the actuators 52 for the brakes 40 and the wheel spindown data, such as wheel angular velocity and wheel rotational energy for example, after an aircraft takes off. The system 60 includes a control system 62 configured to communicate with the brake actuator controller 64. A wheel system 66 is indirectly coupled to the control system 62 through the brake actuator controller 64. The control system 62 may also be configured to communicate with a cockpit control 68. In one embodiment, the control system 62 includes a computer-based system configured to analyze signals received from any of the systems or a device operably coupled thereto. The control system 62 can include hardware, software, or both.

Referring now to FIGS. 1-5, when an aircraft takes off, the aircraft and therefore the aircraft wheels 18, 28 reach a high speed. Once the aircraft has lifted off of the ground, the external forces causing the wheels 18, 28 to spin are substantially reduced and/or removed, and thus the wheels 18, 28 begin to spindown towards a complete stop (zero rotational wheel speed). Ideally, all of the wheels 18, 28 spindown or decelerate at a similar rate. However, if a wheel 18, 28 decelerates faster than another wheel 18, 28, it may be an indication that the more rapidly decelerating wheel is subject to one or more outside forces. For example, a brake 40 that is dragging may cause a wheel 18, 28 to rapidly spindown shortly after take-off.

Figure 7:
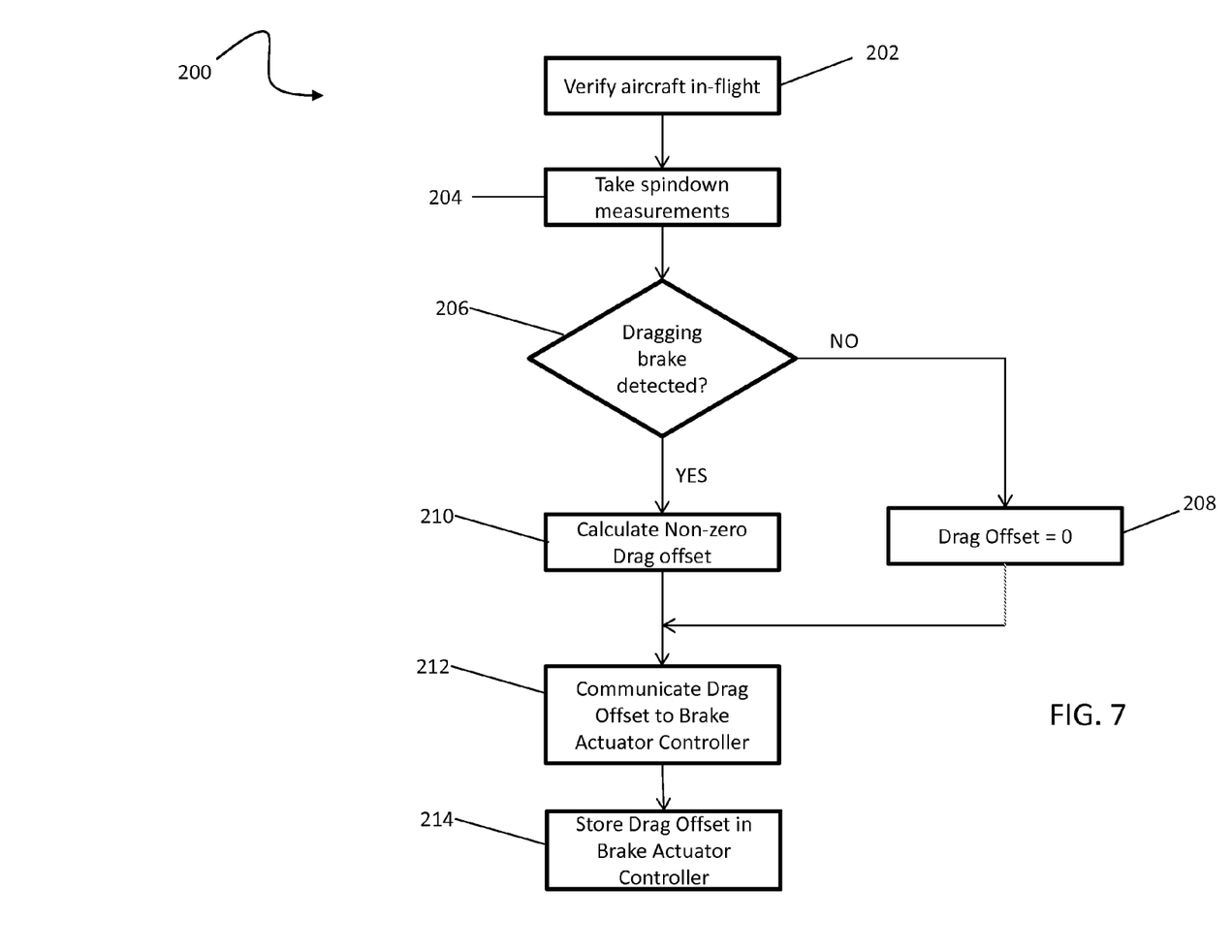

A method 200 of determining a drag offset value is illustrated in FIG. 7. The discussion of FIG. 7 below will refer to elements shown in FIGS. 1-6 from time to time. After take-off, as shown in block 202, an indicator on the landing gear mechanism 10, 20, such as a weight on wheels indicator for example, changes from an on ground state to an in-flight state. Before the wheels 18, 28 are retracted into the landing gear bay of the aircraft, the wheel system 66 takes one or more spindown data measurements (see block 204) for each of the wheels 18, 28 which are then used to generate a spindown profile. Both the spin down measurements and the spindown profile are provided to the control system 62. For real-time spindown data, for example on a two-wheel aircraft as shown in FIGS. 1 and 2, the wheel 18 with the highest velocity may be used at least partially to generate a spindown profile. The velocity of the first wheel 18 may be used as a benchmark for comparison with another wheel's velocity versus time. In another embodiment, for example when a landing mechanism 20 has more than two wheels 28, such as shown in FIGS. 3 and 4 for example, the aircraft may provide additional spindown data. As such, a real-time comparison between the spindown data of the wheels 28 may be improved, due to the presence of additional wheels 28 for which measurements of spindown data can be compared. Alternatively, spindown measurements from one or more wheels 18, 28 may be utilized to construct an average spindown profile. For example, in an aircraft having three landing gear mechanisms 20, each of which includes four wheels 28, all twelve wheels 28 may be expected to spindown at approximately the same rate. Thus spindown data for all twelve wheels 28 may be utilized to construct an average spindown profile for the aircraft.

As illustrated in block 206, the control system 62 determines if the deviation between the spindown profile and the spindown data measurements for each wheel 18, 28 of the aircraft is within an acceptable limit. The deviation between the spindown profile and the measured spindown data is indicative of whether a brake is dragging for each of the wheels 18, 28. If the spindown measurements for all of the wheels 18, 28 are approximately the same, then no brake drag is occurring, the brake drag offset is zero, as shown in block 208, and the process terminates until the next flight cycle. However, if the spindown data measurements for one or more wheels 18, 28 are outside the allowable deviation from the spindown profile, then at least one wheel 18, 28 may have an excessive drag force imposed on it. In response to determining that the spindown of a wheel 18, 28 is outside the allowable spindown profile, the control system 62 calculates a drag offset, as shown in block 210. In one embodiment, the drag offset is calculated using an algorithm stored within the control system 62. Alternatively, the drag offset may be determined using a table stored within the control system 62. In block 212, the control system communicates the drag offset to the brake actuator controller 64 where it is stored, as shown in block 214.

One possible cause of a dragging brake 40 is an electric actuator 52 that did not retract far enough and as a result, a residual force is applied to the stack 44. Expansion and contraction due to temperature changes, as well as wear on the surface of the actuators 52 can affect the accuracy of the positioning of the actuators 52. Therefore, there is a need to frequently recalculate the zero torque position of the actuators 52.

Figure 8:
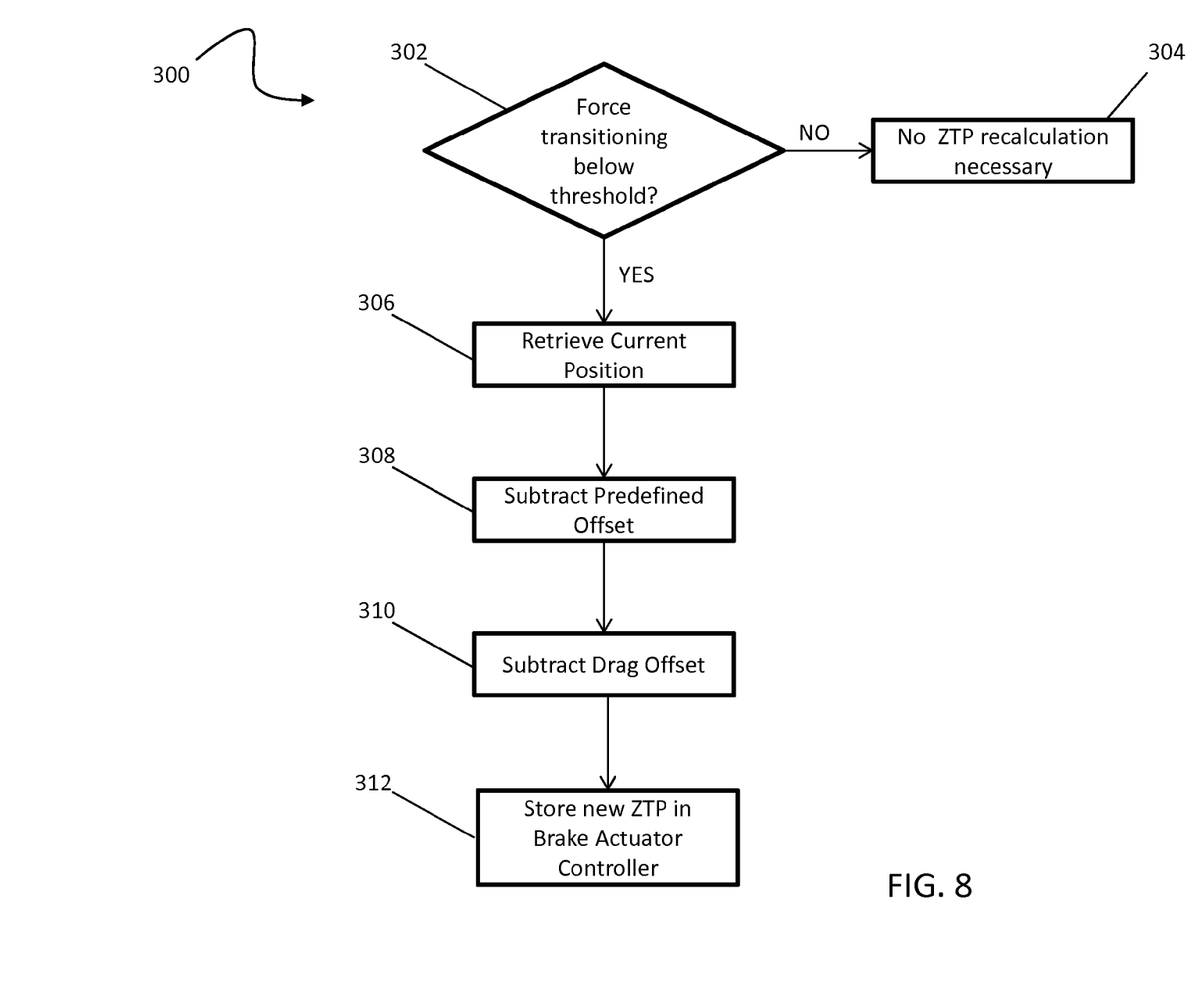

Referring now to FIG. 8, a method 300 for adjusting the position of the electrical actuators 52 of a brake 40 to prevent dragging is illustrated. The force applied by the actuators 52 is continuously monitored with a load measuring device (not shown), such as a load cell or force estimator for example, coupled to the brake actuator controller 64. Every time this force transitions below a predefined threshold, the zero torque position (ZTP) of the actuators 52 is recalculated, as shown in block 302. The load cell is less accurate when measuring forces below the predefined threshold. The predefined threshold will vary based on the application and load cell used, and therefore may be anywhere from about zero up to about 15% of the maximum force measurable by the load cell. In one embodiment, the range of the predefined threshold is from about zero to about 1000 lbs. If the force measured on the load cell is above the predefined threshold, the ZTP of the actuators 52 does not need to be recalculated (see block 304). However, if the force measured transitions below the predefined threshold, the brake actuator controller determines the current position of the actuators 52 in block 306.

In block 308, a predefined constant offset stored within the brake actuator controller 64 is subtracted from the current ZTP of the actuator 52 to determine a new ZTP of the actuators 52. In addition, in block 310, the drag offset calculated in method 200 when determining whether the spindown of each wheel 18, 28 was within an acceptable spindown profile, is similarly subtracted from the current ZTP of the actuator 52. Subtraction of the drag offset compensates for a dragging brake condition. After modifying the position of the actuators 52 with both the predefined offset and the drag offset, the new zero torque position (ZTP) is stored within the brake actuator controller 64, as shown in block 312, such that the next time the actuators 52 are commanded to the ZTP, the actuators 52 will move to this newly calculated position. The control system 62 may be configured to alert the cockpit control 68 when the recalculated ZTP of the actuators 52 indicates that the surface is worn and the brake 40 is in need of service.

The brake actuator controller 64 of an aircraft is configured to automatically adjust the stored zero torque position of an electric actuator 52 of a brake 40. By incorporating this functionality into the brake actuator controller 64, the performance of the brake system 40 is improved and maintenance and troubleshooting time for the landing gear mechanism 10, 20 is reduced. For example, maintenance may only be needed when indicated by the control system 62.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of automatically adjusting at least one electric actuator of a brake to prevent dragging comprising:
    measuring a force applied by the at least one actuator to a load measuring device;
    verifying that the force applied by the at least one actuator is below a predetermined threshold;
    subtracting a predefined offset from a current zero torque position of the at least one actuator;
    subtracting a drag offset from the current zero torque position of the actuator to further compensate for a dragging brake condition; and
    storing a new zero torque position (ZTP) in a brake actuator controller configured to control the brake.

2. The method according to claim 1, wherein the brake is coupled to a wheel of a landing gear mechanism for an aircraft.

3. The method according to claim 2, wherein the predetermined threshold is in the range of about zero to about 15% of a full load of the load measuring device.

4. The method according to claim 3, wherein the predetermined threshold is in the range of between about zero and about 1000 lbs.

5. The method according to claim 1, wherein the force applied by the at least one actuator is continuously measured.

6. The method according to claim 1, wherein if the force applied to the load measuring device is above the predetermined threshold, no adjustment of the current ZTP is necessary.

7. The method according to claim 1, wherein the method occurs within the brake actuator controller.

8. The method according to claim 1, wherein the drag offset remains constant until a next flight cycle.

9. The method according to claim 8, wherein the brake actuator controller is operably coupled to a control system.

10. The method according to claim 9, wherein the drag offset is determined by the control system in response to detecting a dragging brake.

11. The method according to claim 10, wherein detection of a the dragging brake occurs after take-off of an aircraft.

12. The method according to claim 10, wherein the control system detects the dragging brake if spindown data measurements are outside an allowable spindown profile.

13. The method according to claim 10, wherein the drag offset is calculated by an algorithm stored in the control system.

14. The method according to claim 10, wherein the drag offset is calculated using a table stored in the control system.

15. The method according to claim 10, wherein the control system communicates the drag offset to the brake actuator controller.

16. The method according to claim 10, wherein the control system is operably coupled to a cockpit control and is configured to send a signal to the cockpit control when maintenance of the brake is required.

17. The method according to claim 1, wherein the brake is a disc brake.

* * * * *